(12) United States Patent
Barlow

(10) Patent No.: US 7,690,149 B2
(45) Date of Patent: Apr. 6, 2010

(54) FAN FOLD SUPPORT

(75) Inventor: Janice A Barlow, Broken Arrow, OK (US)

(73) Assignee: U.S. Metalcraft, Inc., Delphos, OH (US)

( * ) Notice: Subject to any disclaimer, the term of this patent is extended or adjusted under 35 U.S.C. 154(b) by 110 days.

(21) Appl. No.: 12/025,034

(22) Filed: Feb. 3, 2008

(65) Prior Publication Data

US 2008/0116103 A1     May 22, 2008

Related U.S. Application Data

(63) Continuation-in-part of application No. 11/265,599, filed on Nov. 2, 2005, now abandoned, which is a continuation-in-part of application No. 11/015,539, filed on Dec. 17, 2004, now Pat. No. 7,059,082.

(60) Provisional application No. 60/532,675, filed on Dec. 24, 2003.

(51) Int. Cl.
*A01G 5/00* (2006.01)
(52) U.S. Cl. ..................... 47/41.12; 47/41.01
(58) Field of Classification Search ................ 47/41.12; 493/334
See application file for complete search history.

(56) References Cited

U.S. PATENT DOCUMENTS

| | | | | |
|---|---|---|---|---|
| 3,515,036 A | * | 6/1970 | Ota et al. | ..................... 493/334 |
| 4,201,029 A | * | 5/1980 | Lerner et al. | .................. 53/429 |
| 5,042,789 A | * | 8/1991 | Hediger | ................... 270/39.03 |

* cited by examiner

Primary Examiner—Francis T Palo
(74) Attorney, Agent, or Firm—Martin S. High, P.C.

(57) ABSTRACT

The embodiments of Fan Fold Support employ a foam sheet with folds and apertures formed by the foam sheet. The apertures are formed by the foam sheet at alternating folds so that every other fold has an aperture. The final end shape is formed by folding in an accordion-like manner the folds and secured with a compression band. When folded the foam sheet folds are oriented at the top of the folded structure and the apertures are located at the bottom of the folded structure. The sheet may be of various geometry so as to accommodate a variety of final folded end shapes such as a block form, an oval shape, a square, a cylindrical, a cone, a cubic, hexagon, a pentagon, and other multi-sided structures. Objects to be supported are then placed between the folds formed by the foam sheet in the Fan Fold Support.

18 Claims, 6 Drawing Sheets

FAN FOLD SUPPORT

CROSS-REFERENCE TO RELATED APPLICATIONS

This application is a continuation-in-part of co-pending U.S. patent application Ser. No. 11/265,599, entitled "Memorial Vase Insert Live Flower and Helium Balloon Holder" filed on Nov. 2, 2005. U.S. patent application Ser. No. 11/265,599, in turn is a continuation-in-part application and claims the benefit of currently co-pending U.S. patent application Ser. No. 11/015,539, filed on Dec. 17, 2004, entitled "Memorial Vase Insert Artificial Flower and Helium Balloon Holder." Patent application Ser. No. 11/015,539, issued on Jun. 13, 2006 as U.S. Pat. No. 7,059,082. U.S. patent application Ser. No. 11/015,539, in turn claims the benefit of U.S. Provisional Application No. 60/532,675 filed on Dec. 24, 2003 titled "Memorial Vase Insert Artificial Flower and Helium Balloon Holder." U.S. patent application Ser. No. 11/265,599, U.S. patent application Ser. No. 11/015,539 and U.S. Provisional Patent Application No. 60/532,675 are incorporated by reference in their entirety as if fully set forth herein.

STATEMENT REGARDING FEDERALLY SPONSORED RESEARCH OR DEVELOPMENT

Not applicable.

REFERENCE TO A "SEQUENCE LISTING," A TABLE, OR A COMPUTER PROGRAM LISTING

Not applicable.

BACKGROUND

1. Field of Invention

The field of the Fan Fold Support generally pertains to the vertical or near-vertical support of tubular, cylindrical or long flat, thin objects that require support to be useful or readily accessible to the user. In addition, the objects to be supported may in turn may be used to support other objects such as a variety of ornamental objects including artificial flowers and flags. In one application of an embodiment of the Fan Fold Support, the field of the Fan Fold Support is directed to supporting stems of natural and artificial flowers, pencils, and flags.

2. Description of Prior Art

The prior art in the field of the Fan Fold Support can be generally characterized as either open containers, magnetic holders, cups, drawers or other devices to hold tubular, elongated and flat, or cylindrical objects. In most cases, the prior art is simple cup-like or bowl-like objects that hold objects such as kitchen tools, screwdrivers, toothbrushes and the like.

The prior art in this field suffers from some basic deficiencies that the Fan Fold Support addresses. First, the prior art that teaches cup-like or bowl-like objects when tipped over can spill the contents of the cup or bowl. Second, cups or bowls do not hold their contents in a secure fashion in that the objects in the bowl lean against the side of the cup or bowl and do not remain vertical or near vertical and are arranged around the circumference of the cup or bowl shaped object. Also, objects to be secured that are of varying lengths secured in cup-like objects make it difficult to retrieve the shorter objects.

BRIEF SUMMARY OF THE EMBODIMENTS

In view of the disadvantages inherent in the known types of the prior art relating to the field of the Fan Fold Support, the various embodiments of the Fan Fold Support described below overcome these disadvantages.

The embodiments of the Fan Fold Support teach a device that is capable of securing in a vertical or near-vertical manner tubular, cylindrical, or long flat, thin objects that require support to be useful or readily accessible to the user.

The Fan Fold Support achieves this goal by employing a foam sheet with folds and apertures formed by the foam sheet. The apertures are formed by the foam sheet at alternating folds. In other words, every other fold has an aperture. The final end shape is formed by folding the structure in an accordion-like manner. When folded the foam sheet folds, that is the folds without apertures, are oriented at the top (upwards) of the folded structure and the apertures are located at the bottom (downwards) of the folded structure. The end structure then is an accordion like structure with folds at the top and apertures at the bottom.

The sheet may be of various geometries so as to accommodate a variety of final folded end shapes. In one embodiment of the Fan Fold Support, the foam sheet may be a rectangular sheet. When folded this rectangular sheet then forms a rectangular block embodiment of the Fan Fold Support. In another embodiment of the Fan Fold Support, the sheet is of a geometry with a central section of uniform width and with ends with a gradual taper, the embodiment is then a folded in an oval shape. Other embodiments are possible which lead to other final folded structure geometries including, but not limited to, square, cylindrical, conical, cubic, hexagonal, pentagonal and other multi-sided structures. Therefore, embodiments described herein are not intended to limit the disclosure, but by providing examples to show the various end shapes that can be constructed by a person ordinary skilled in the art.

There has thus been outlined, rather broadly, the more important features of the Fan Fold Support in order that the detailed description thereof that follows may be better understood, and in order that the present contribution to the art may be better appreciated. There are, of course, additional features of the Fan Fold Support that will be described hereinafter and which will form the subject matter of the claims appended hereto.

In this respect, before explaining at least one embodiment of the Fan Fold Support in detail, it is to be understood that the Fan Fold Support is not limited in this application to the details of construction and to the arrangements of the components set forth in the following description or illustrated in the drawings. The Fan Fold Support is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the Fan Fold Support. Additional benefits and advantages of the Fan Fold Support will become apparent in those skilled in the art to which the Fan Fold Support relates from the subsequent description of the preferred embodiment and the appended claims, taken in conjunction with the accompanying drawings. It is important, therefore, that the claims be regarded as including such equivalent constructions insofar as they do not depart from the spirit and scope of the Fan Fold Support.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the Fan Fold Support of the application which is measured by the claims, nor is it intended to be liming as to the scope of the Fan Fold Support in any way.

DETAILED DESCRIPTION OF THE EMBODIMENTS

In the detailed description of the Fan Fold Support, the definition of objects to be supported by the Fan Fold Support are to be construed very broadly to be any long and thin object. The objects can be of circular profile and be solid or hollow. The objects can also have an essentially flat profile. Examples of the objects that can be supported by the Fan Fold Support included, but not limited to, the following: flower stems, screwdrivers, small wrenches, screws and bolts, pliers, razor knifes, spoons, ladles, spatulas, whisks, skewers, nail clippers, nail files, wood or metal files, rulers, fillet knives, fishing rods, pencils, pens, scissors, rulers, letter openers, CD's, DVD's, file folders, scissors, scrapbook supplies, artist brushes, photos, cardboard, drill bits, putty knives, paint openers, router bits, wrenches, pliers, dowel, glass panes, paint stick mixer, mens razors, women's razors, mascara, eyebrow pencils, eyeliners, makeup brushes, nail files, combs, and paint brushes.

The Fan Fold Support 100 is comprised of a folded foam sheet 101 and a compression band 104. The folded foam sheet 101 forms a plurality of folds 102 along the long axis of the foam sheet, and a plurality of apertures 103 along the long axis of the foam sheet. The folds and the apertures are formed perpendicular to the long axis of the folded foam sheet. The apertures 103 are comprised of openings formed by the foam sheet 101. The apertures 103 are formed by the foam sheet 101 such that the apertures span nearly the entire width of the foam sheet 101, but not so wide as to compromise the integrity of the foam sheet 101. That is, the apertures 103 are wide enough for objects to easily pass through the foam sheet as described below, but not so wide as to cut the sheet. In an embodiment of the Fan Fold Support, the apertures are centered along the width of the foam sheet 101 and occupied between 50% and 95% of the width of the sheet.

When the Fan Fold Support is constructed by folded the foam sheet (see FIG. 1. as an example), the apertures 103 are located on the bottom of the resulting fan fold structure. The apertures 103 allow objects inserted into the top of the fan fold structure to pass through the fan fold structure and out the bottom of the fan fold structure through the apertures 103.

The folds 102 formed by the foam sheet 101 can be formed by any method that allows the fan fold to be easily bent or folded into the appropriate structure. In one embodiment of the Fan Fold Support, the folds are formed by through a linear set of perforations across the width of the foam sheet 101. When the foam sheet 101 is folded the folds are formed along the perforations. In a embodiment of the Fan Fold Support, perforations are also formed across the foam sheet bisecting the apertures 103

Figure 1:
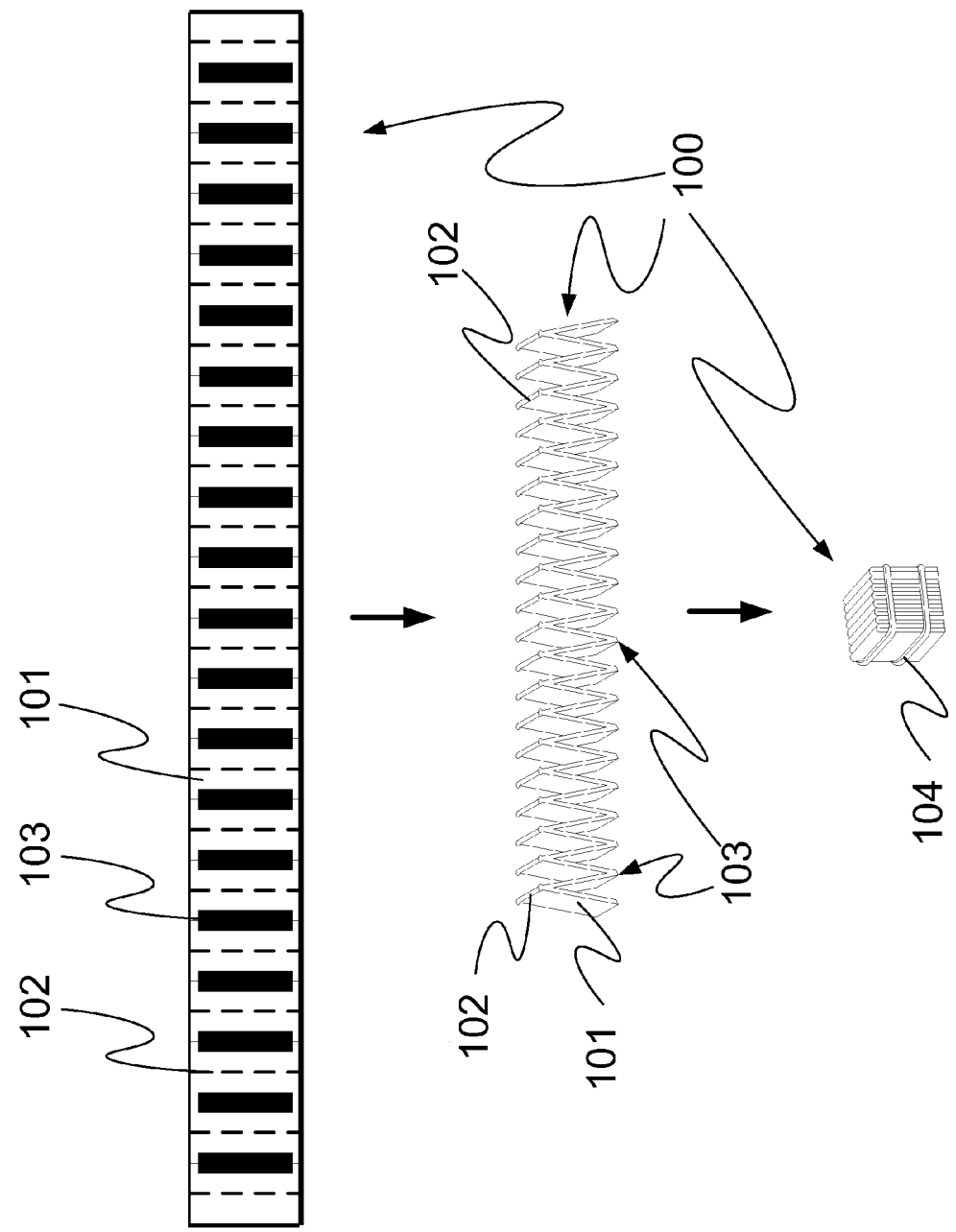
FIG. 1 illustrates three views of one embodiment of the fan fold support showing the embodiment in the completely extended orientation (top view), a intermediate compressed orientation (middle view), and a complete compressed orientation with a compression band (bottom view). In this preferred embodiment, the fan fold is constructed to form an square shaped fan fold support.

The Fan Fold Support is formed by folding the foam sheet 101 in an accordion like manner with the folds 102 at the top of the fan fold structure and the apertures 103 at the bottom of the fan fold structure (see FIG. 1 as an example). The foam sheet 101 is folded to the point that a fan fold structure is formed, and this fan fold structure is maintained with a compression band 104. The compression band is comprised of a thin flexible band that extends around the fan fold structure and maintains the shape of the fan fold structure. The compression band is manufactured from any thin flexible material but is generally manufactured from polymeric, rubber, or metallic materials.

Figure 2:
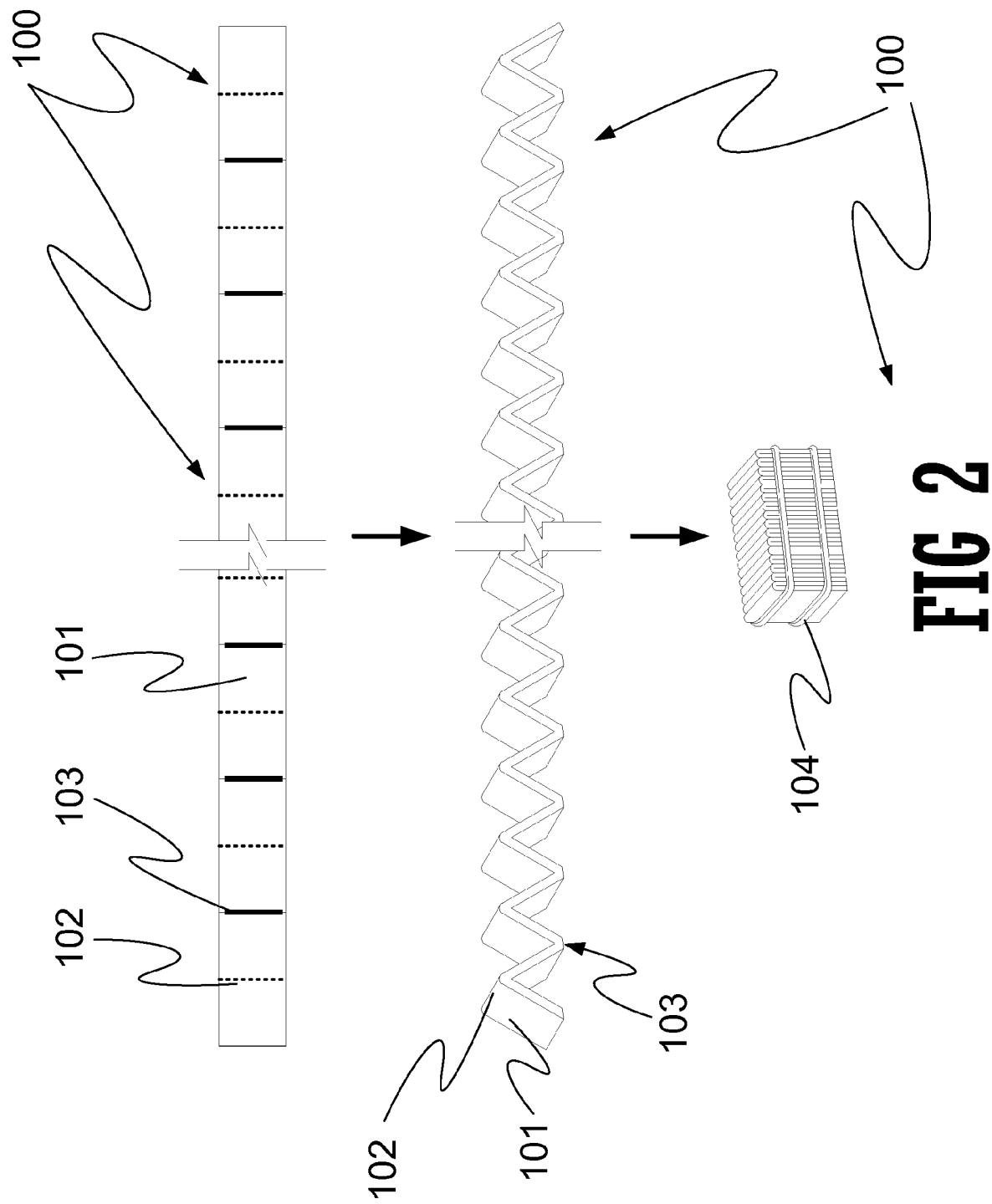
FIG. 2 illustrates three views of one embodiment of the fan fold support showing the support in the completely extended orientation (top view), a intermediate compressed orientation (middle view), and a complete compressed orientation with a compression band (bottom view). In this preferred embodiment, the fan fold is constructed to form an rectangular shaped fan fold support.
Figure 3:
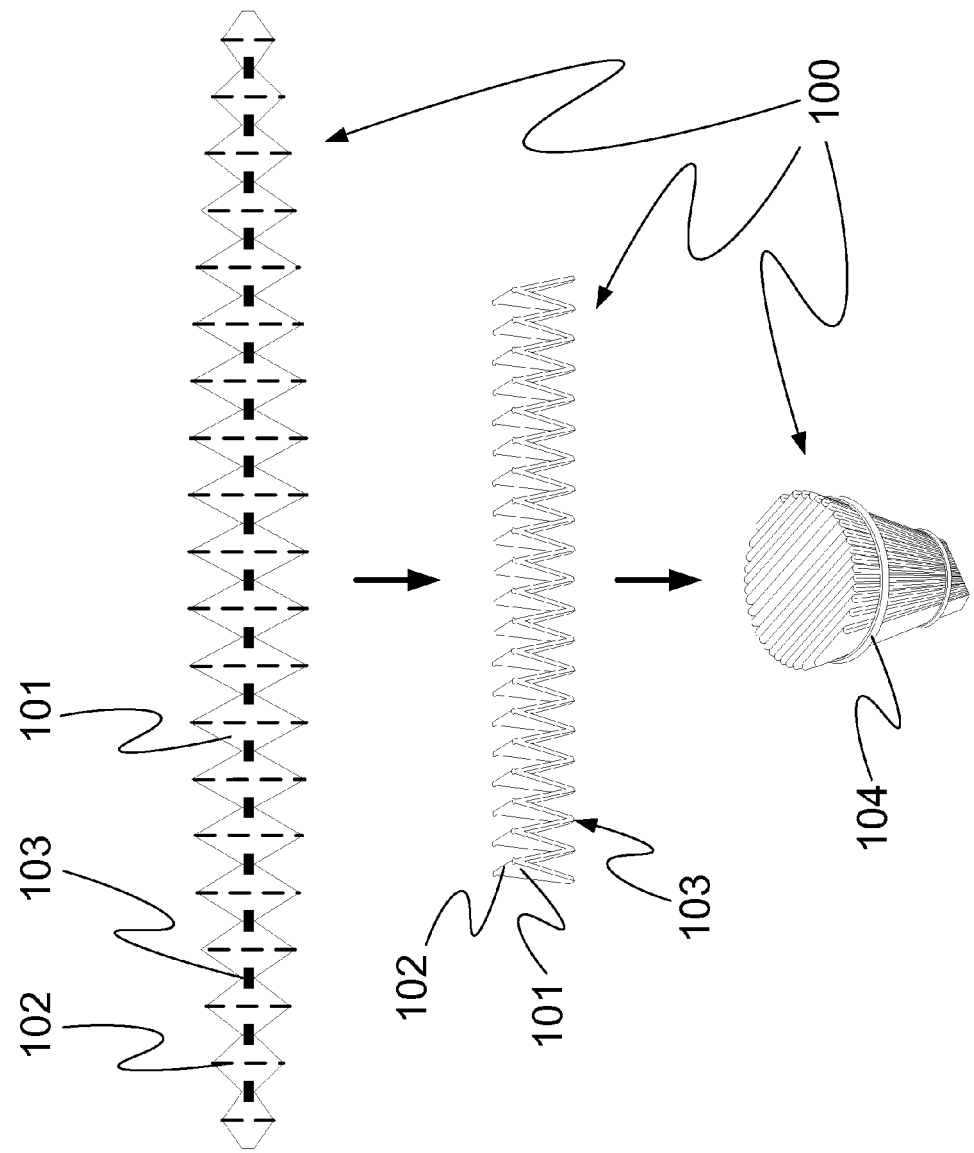
FIG. 3 illustrates three views of one embodiment of the fan fold support showing the support in the completely extended orientation (top view), a intermediate compressed orientation (middle view), and a complete compressed orientation with a compression band (bottom view). In this preferred embodiment, the fan fold is constructed to form an conical shaped fan fold support.
Figure 4:
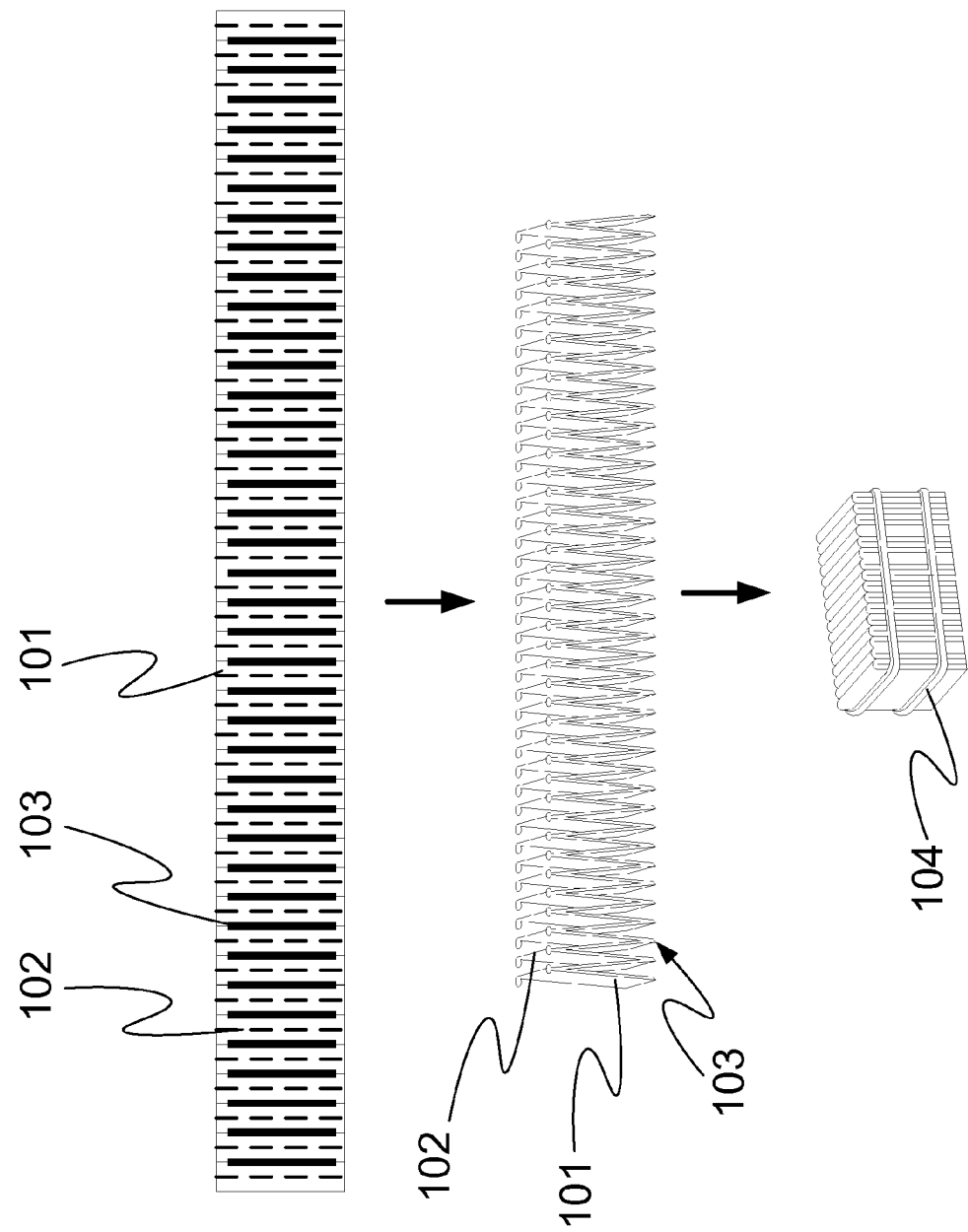
FIG. 4 illustrates three views of one embodiment of the fan fold support showing the support in the completely extended orientation (top view), a intermediate compressed orientation (middle view), and a complete compressed orientation with a compression band (bottom view). In this preferred embodiment, the fan fold is constructed to form an short, rectangular shaped fan fold support.
Figure 5:
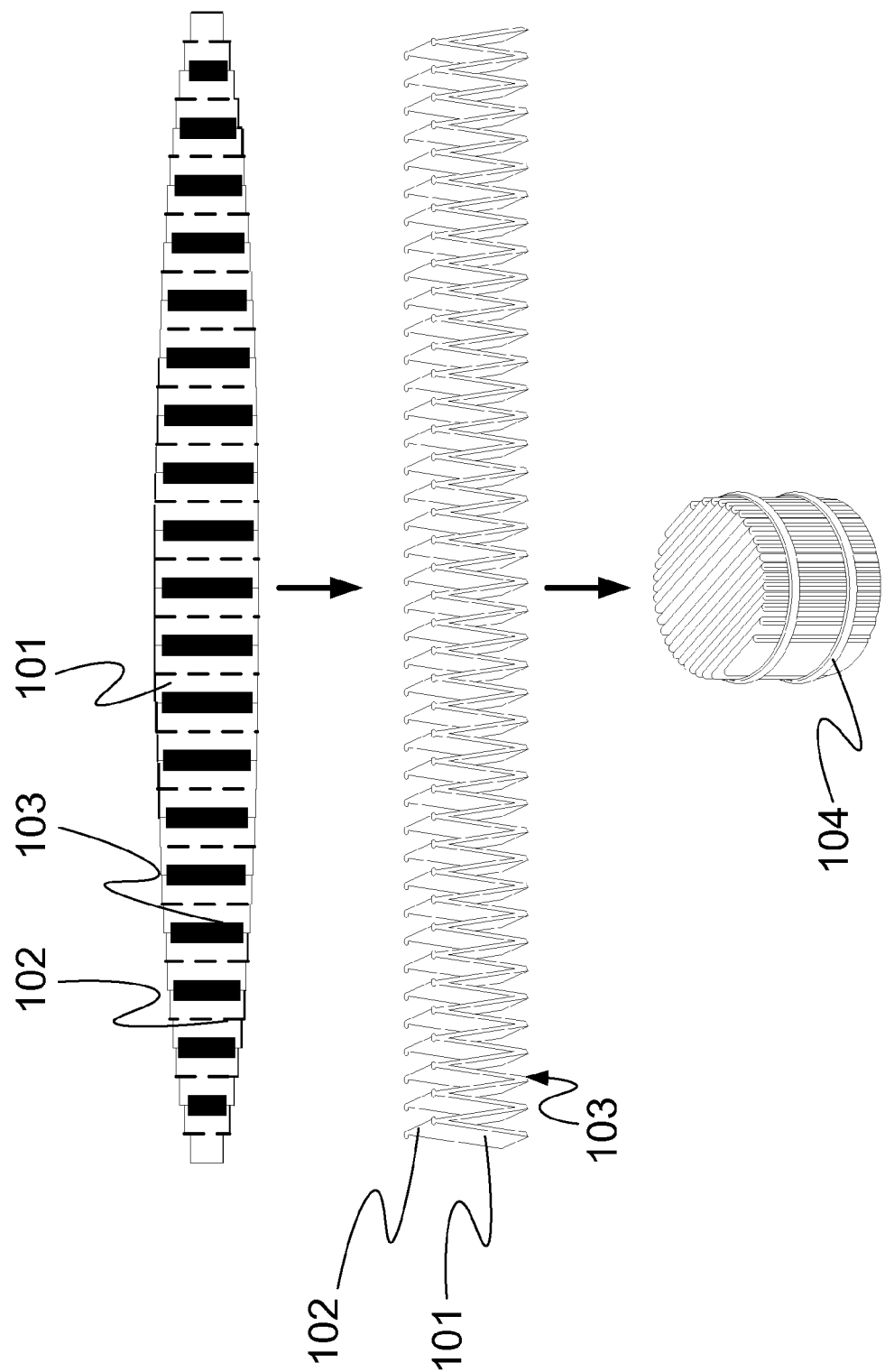
FIG. 5 illustrates three views of one embodiment of the fan fold support showing the support in the completely extended orientation (top view), a intermediate compressed orientation (middle view), and a complete compressed orientation with a compression band (bottom view). In this preferred embodiment, the fan fold is constructed to form an cylindrical shaped fan fold support.
Figure 6:
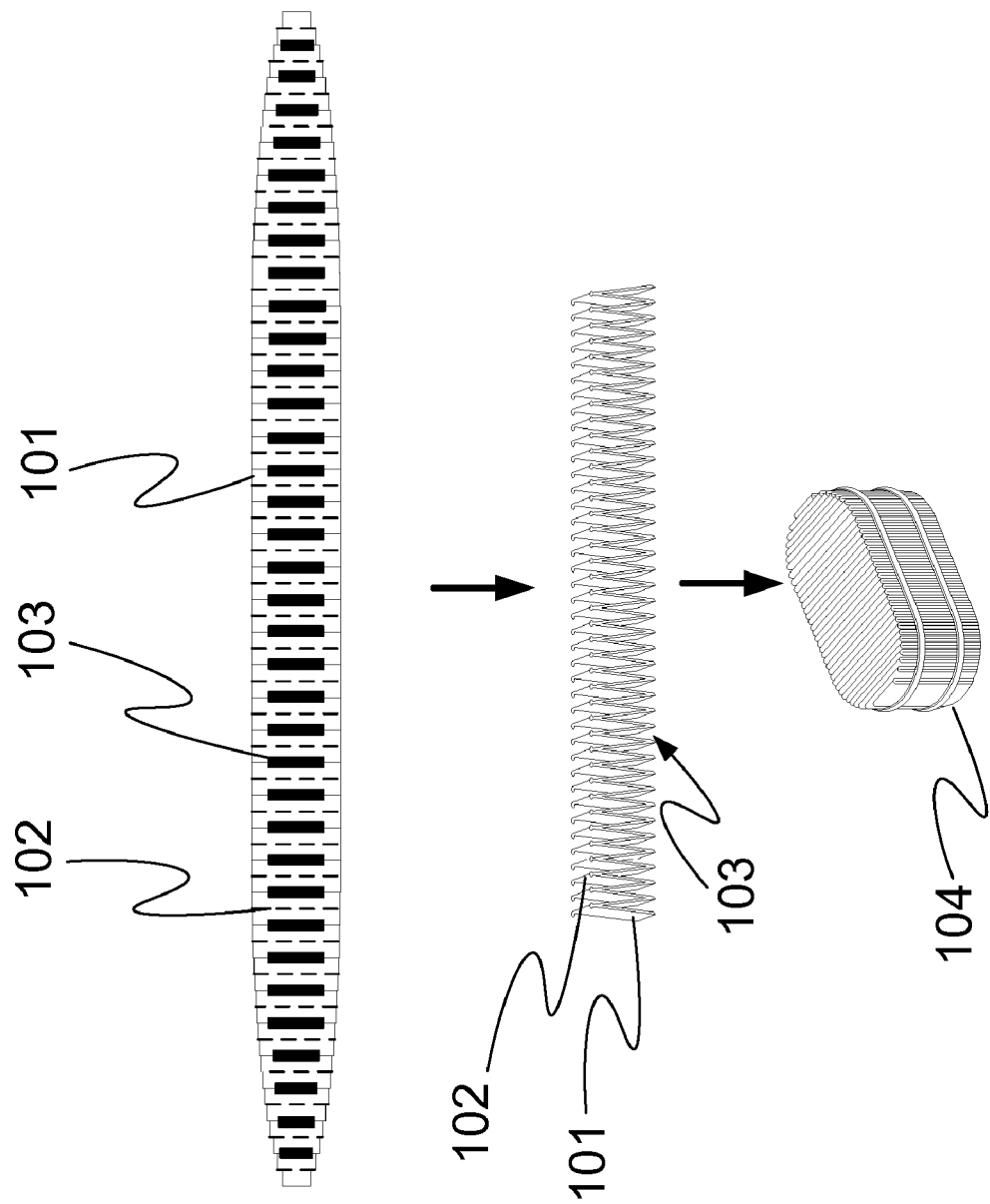
FIG. 6 illustrates three views of one embodiment of the fan fold support showing the support in the completely extended orientation (top view), a intermediate compressed orientation (middle view), and a complete compressed orientation with a compression band (bottom view). In this preferred embodiment, the fan fold is constructed to form an oval shaped fan fold support.

Embodiments of the Fan Fold Support are comprised of a variety of shapes of the fan fold structure. The variety of shapes can be formed by using a variety of shapes of foam sheet 101. For example, a relatively short foam sheet forms an essentially cube shaped fan fold structure as shown in FIG. 1. An relatively longer foam sheet 101 forms a rectangular cube shaped fan fold structure as shown in FIG. 2. In an embodiment of the Fan Fold Support where the foam sheet 101 is narrow at the ends and wide in the mid portion of the foam sheet 101 forms an essentially cylindrical fan fold structure as shown in FIG. 3. In another embodiment of the Fan Fold Support the foam sheet 101 tapers towards the end of the foam sheet 101 and is parallel in the mid portion of the foam sheet 101 forms an essentially oval shaped fan fold structure as shown in FIG. 4. Different sizes of foam sheets 101 form different sizes of fan fold structures. Therefore, the Fan Fold Support can be adapted for a variety of uses to hold a wide variety of objects. This description is to be construed broadly to include a variety of possible shapes and sizes of various embodiments of the Fan Fold Support that can be constructed from a fan fold structure in turn comprised of a contiguous sheet of material.

In the best mode of operation of the Fan Fold Support, the foam sheet with the folds and apertures is folded into an accordion-like lamellar shape and held in place with a compression band. Depending on the final shape of the Fan Fold Support, the Fan Fold Support, may be placed inside other objects such as vases, cups, molds, and cups. The objects to be supported are then placed between the folds formed by the foam sheet in the Fan Fold Support.

What is claimed is:

1. A fan fold support comprising
    a foam sheet, wherein the foam sheet forms
        a plurality of folds, and
        a plurality of apertures
            wherein both the plurality of folds and the plurality of apertures are formed perpendicular to the long axis of the foam sheet;
    wherein the foam sheet is compressed into a folded configuration;
    wherein the foam sheet is secured into the folded configuration by a compression band; and
    wherein the foam sheet is manufactured from polymeric foam.

2. The fan fold support described in claim 1 wherein the foam sheet in extended form is shaped rectangularly so when the foam sheet is compressed the fan fold support forms a rectangular block.

3. The fan fold support described in claim 2 wherein the foam sheet in extended form has rectangular shape with length to width ratio between 2 and 100.

4. The fan fold support described in claim 1 wherein the foam sheet in extended form is shaped in a series of essentially diamond shapes so when the foam sheet is compressed the fan fold support forms a cone.

5. The fan fold support described in claim 1 wherein the foam sheet in extended form is shaped in an essentially tapered shape wherein the ends of the foam have a narrow width compared to the middle of the foam so when the foam sheet is compressed the fan fold support forms a cylinder.

6. The fan fold support described in claim 1 wherein the foam sheet in extended form is shaped in an essentially tapered shape wherein the ends of the foam have a narrow width compared to the middle of the foam but a substantial portion of the middle of the foam has uniform width so that when the foam sheet is compressed the fan fold support forms an oval.

7. The method of using a fan fold support for supporting objects
    wherein the fan fold support is comprised of
        a foam sheet, wherein the foam sheet forms a plurality of folds and a plurality of apertures;
        wherein the foam sheet is compressed into a folded configuration and is secured into the folded configuration by a compression band,
        wherein the foam sheet is manufactured from polymeric foam, and
    wherein objects are supported by the fan fold by inserting the objects between the foam folds.

8. The method of using a fan fold support for supporting objects described in claim 7 wherein the foam sheet in extended form is shaped rectangularly so when the foam sheet is compressed the fan fold support forms a rectangular block.

9. The method of using a fan fold support for supporting objects described in claim 7 wherein the foam sheet in extended form has rectangular shape with length to width ratio between 2 and 100.

10. The method of using a fan fold support for supporting objects described in claim 7 wherein the foam sheet in extended form is shaped in a series of essentially diamond shapes so when the foam sheet is compressed the fan fold support forms a cone.

11. The method of using a fan fold support for supporting objects described in claim 7 wherein the foam sheet in extended form is shaped in an essentially tapered shape wherein the ends of the foam have a narrow width compared to the middle of the foam but a substantial portion of the middle of the foam has uniform width so that when the foam sheet is compressed the fan fold support forms an oval.

12. The method of using a fan fold support for supporting objects described in claim 7 wherein the ends of the foam have a narrow width compared to the middle of the foam so when the foam sheet is compressed the fan fold support forms a cylinder.

13. A system to support vertically or nearly-vertical tubular, cylindrical, or long flat, thin objects comprising
    a foam sheet, wherein the foam sheet forms
        a plurality of folds, and
        a plurality of apertures
            wherein both the plurality of folds and the plurality of aperatures are formed perpendicular to the long axis of the foam sheet;
    wherein the foam sheet is compressed into a folded configuration;
    wherein the foam sheet is secured into the folded configuration by a compression band; and
    wherein the foam sheet is manufactured from polymeric foam.

14. A system to support vertically or nearly-vertical tubular, cylindrical, or long flat, thin objects described in claim 13 wherein the foam sheet in extended form is shaped rectangularly so when the foam sheet is compressed the fan fold support forms a rectangular block.

15. A system to support vertically or nearly-vertical tubular, cylindrical, or long flat, thin objects described in claim 14 wherein the foam sheet in extended form has rectangular shape with length to width ratio between 2 and 100.

16. A system to support vertically or nearly-vertical tubular, cylindrical, or long flat, thin objects described in claim 15 wherein the foam sheet in extended form is shaped in a series of essentially diamond shapes so when the foam sheet is compressed the fan fold support forms a cone.

17. A system to support vertically or nearly-vertical tubular, cylindrical, or long flat, thin objects described in claim 16 wherein the foam sheet in extended form is shaped in an essentially tapered shape wherein the ends of the foam have a narrow width compared to the middle of the foam but a substantial portion of the middle of the foam has uniform width so that when the foam sheet is compressed the fan fold support forms an oval.

18. A system to support vertically or nearly-vertical tubular, cylindrical, or long flat, thin objects described in claim 17 wherein the ends of the foam have a narrow width compared to the middle of the foam so when the foam sheet is compressed the fan fold support forms a cylinder.

* * * * *